United States Patent [19]

Conway

[11] Patent Number: 5,664,360
[45] Date of Patent: Sep. 9, 1997

[54] GAME CALL HOLSTER

[76] Inventor: John Conway, P.O. Box 841, Dryden, N.Y. 13053

[21] Appl. No.: 631,136

[22] Filed: Apr. 15, 1996

[51] Int. Cl.$^6$ .......................... F41A 15/00; F41A 29/00; F41A 31/00
[52] U.S. Cl. .................. 42/90; 42/72; 42/71.02; 42/1.09; 42/71.01; 42/96
[58] Field of Search .................. 42/90, 72, 71.02, 42/1.09, 71.01, 96

[56] References Cited

U.S. PATENT DOCUMENTS

| | | | |
|---|---|---|---|
| 2,605,033 | 7/1952 | Terry | 224/0.5 |
| 4,644,987 | 2/1987 | Kiang | 150/52 R |
| 4,733,808 | 3/1988 | Turner, Jr. et al. | 224/219 |
| 4,860,478 | 8/1989 | Clayton | 42/71.01 |
| 4,883,171 | 11/1989 | Carlton | 206/315.11 |
| 5,035,390 | 7/1991 | Sanders | 248/231 |
| 5,111,981 | 5/1992 | Allen | 224/202 |
| 5,431,590 | 7/1995 | Abbas | 446/207 |

*Primary Examiner*—Charles T. Jordan
*Assistant Examiner*—Meena Chelliah
*Attorney, Agent, or Firm*—Barnard, Brown & Michaels

[57] ABSTRACT

A holster for game calls which can be fastened around the stock of a gun or of a bow. The holster has an elongated body made of flexible material, with a plurality of pockets formed on one side. The pockets are preferably formed so as to open toward the center of the elongated body. A fastener, such as hook-and-loop material (Velcro®) allows the elongated body to be wrapped around the gunstock and the ends fastened to each other, so as to form a sleeve around the stock with pockets on the outside. If the pockets are formed to open toward the center of the elongated body, they will open upwards when the holster is fastened around the generally horizontal gunstock. Game calls can be inserted into the pockets, and removed easily without removing the gun from the shoulder of the hunter and without startling the game. A bow-hunting variation has the pockets turned 90°, so that they point toward one side of the elongated body, allowing the pockets to point upwards as the elongated body is fastened around the vertical bowstock.

6 Claims, 1 Drawing Sheet

GAME CALL HOLSTER

FIELD OF THE INVENTION

The invention pertains to the field of accessories for hunters. More particularly, the invention pertains to apparatus for holding game calls or the like on firearms or bows.

BACKGROUND OF THE INVENTION

Hunters often use calls to attract game. In recent years diaphragm-type mouth calls have become common. These calls comprise a generally flat horseshoe shaped frame, suspending one or more diaphragms made of latex or the like. The call is placed in the hunter's mouth and, by blowing over the call, the hunter may imitate the call of the prey. The sound produced by the call is determined by the type and number of diaphragms, the shape of the diaphragm, and various types of cuts which are made.

Particularly in the field of turkey hunting, a hunter may wish to carry a wide variety of calls. These calls are used to imitate various sounds made by turkeys, from the calls of a young turkey to those of an old tom or hen. In the past, the hunter would just put the calls in a pocket, and pull them out as needed. If one is trying to call a bird closer, however, that process might cause the hunter to move enough to startle the turkey. Also, it is important to be able to change calls without having to rummage through one's pockets to find the right call, and without removing one's hands from the gun.

SUMMARY OF THE INVENTION

The invention comprises a holster for game calls which can be fastened around the stock of a gun or of a bow. The holster has an elongated body made of flexible material, with a plurality of pockets formed on one side. The pockets are preferably formed so as to open toward the center of the body. A fastener, such as hook-and-loop material (Velcro®) allows the body to be wrapped around the gunstock and the ends fastened to each other, so as to form a sleeve around the stock with pockets on the outside. If the pockets are formed to open toward the center of the body, they will open upwards when the holster is fastened around the generally horizontal gunstock. Game calls can be inserted into the pockets, and removed easily without removing the gun from the shoulder of the hunter and without startling the game. A bow-hunting variation has the pockets turned 90°, so that they point toward one side of the body, allowing the pockets to point upwards as the body is fastened around the vertical bowstock.

DESCRIPTION OF THE PREFERRED EMBODIMENT

Figure 1:
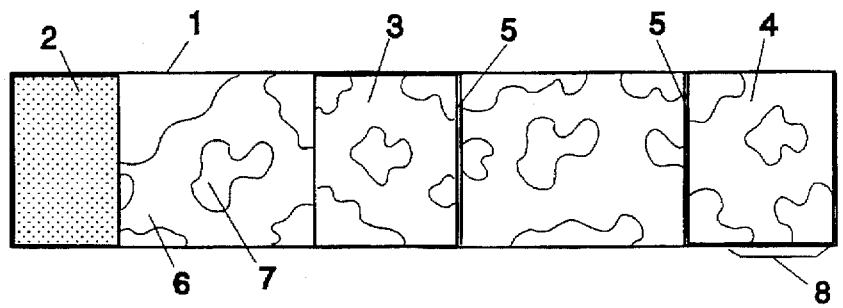
FIG. 1 shows a view of the holster of the invention, unrolled.

FIG. 1 shows the holster of the invention, spread out with the ends unfastened.

The holster comprises a body (1), of elongated rectangular dimensions. The holster of the invention is preferably made of camouflaged fabric, as shown, with two or more colors (6) and (7) in a mottled pattern so as not to catch the eye. The body may be made of a stretchable fabric such as Lycra® or Spandex, or some other fabric, or leather or plastic or some other flexible material, which allows it to be wrapped around a gunstock. If the material is not inherently stretchable, it may be desired to stitch elastic material into the edges of the body.

Each end has a mating portion of a fastening means to allow ends of the body to be attached to each other, forming a sleeve. The fastening means is preferably a hook-and-loop fastening material such commonly known as Velcro®, as shown in FIG. 1, with one part of the material (2) on the outer surface of one end of the body, and the mating material on the underside (8) of the other end. Alternatively, the fastening means could be button(s) and buttonhole(s), mating snap(s) or mating hook(s)-and-eye(s), or any other fastening method known to the art.

In the preferred embodiment, there are two pockets (3) and (4), attached by sewing around the edges and bottom to the body (1). Preferably, the open ends (5) of the pockets face each other around the center of the body.

Figure 2:
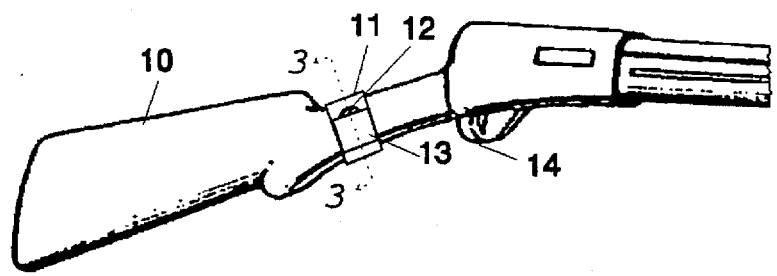
FIG. 2 shows the invention in use on a rifle stock.

Referring to FIG. 2, in use, the body (11) of the holster is wrapped around the gunstock (10), and the fastening means are attached so as to secure the holster in place. The pockets (13) will then open upwards, and game calls (12) can be put in the pockets (13), convenient and ready to use.

Figure 3:
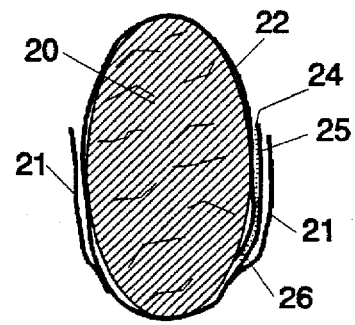
FIG. 3 shows a cut-away view of the invention in use on a rifle stock.

FIG. 3 shows a cross-section through the gunstock (20) along the lines 3—3 of FIG. 2. As can be seen in that figure, the ends (25) and (26) of the body (22) are overlapped and the hook-and-loop fastening material (24) attaches between them. The body (22) is preferably stretched before the fastening, so as to hold the body (22) tightly to the gunstock (20) free from any tendency to slip around the stock. The pockets (21) are then free and pointing in the correct orientation to slip in the game calls, ready for use.

Figure 4:
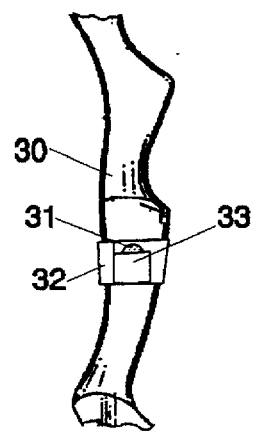
FIG. 4 shows a view of a variation on the invention, in use on a portion of a bow.

As shown in FIG. 4, the invention can be adapted for use with a hunting bow (30). In such an application, since the bow (30) is generally vertical instead of horizontal as is the case with a gun, the pockets (33) are sewn onto the body (32) in such a way that they open toward one side, instead of toward the middle. When the holster is fastened upon the bow by being wrapped around and the fastening means attached, the pockets (33) will then point upward, ready for insertion of the calls (31).

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A holster for game calls comprising:
   a) an elongated body having two ends and a length between, made of a flexible material, the length of the body being sufficient to wrap around the stock of a weapon;
   b) a plurality of generally flat pockets, each formed integral with the body by fastening a generally rectangular piece of flexible material to the elongated body along three sides, forming a pocket having an open end and an enclosed portion, the enclosed portion being sufficiently large to hold a game call;
   c) mating fastening means on each of the ends of the body, such that the ends of the body may be fastened together around the stock of the weapon.

2. The holster of claim 1, in which the open ends of the pockets face toward the middle of the body, such that when the ends of the body are fastened together around the stock of a weapon, and the stock is horizontal, the open ends of the pockets point upward.

3. The holster of claim 1, in which the open ends of the pockets face toward one edge of the elongated body, such that when the ends of the elongated body are fastened together around the stock of a weapon, and the stock is vertical, the open ends of the pockets point upward.

4. The holster of claim 1, in which the fastening means is hook-and-loop fastening material, with the hook material on one end of the elongated body and the mating loop material on the other end.

5. The holster of claim 1, in which the elongated body is made of stretchable material.

6. The holster of claim 1, in which the elongated body is made of camouflaged material.

* * * * *